US012385555B2

(12) United States Patent
Kato et al.

(10) Patent No.: US 12,385,555 B2
(45) Date of Patent: Aug. 12, 2025

(54) VEHICLE DRIVE DEVICE AND METHOD FOR MANUFACTURING PLANETARY GEAR MECHANISM

(71) Applicant: AISIN CORPORATION, Aichi (JP)

(72) Inventors: Mitsuhiko Kato, Kariya (JP); Shintaro Matsuda, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 18/720,898

(22) PCT Filed: Mar. 28, 2023

(86) PCT No.: PCT/JP2023/012357
§ 371 (c)(1),
(2) Date: Jun. 17, 2024

(87) PCT Pub. No.: WO2023/190424
PCT Pub. Date: Oct. 5, 2023

(65) Prior Publication Data
US 2025/0075782 A1 Mar. 6, 2025

(30) Foreign Application Priority Data

Mar. 31, 2022 (JP) .................. 2022-059333

(51) Int. Cl.
F16H 57/00 (2012.01)
B60K 1/00 (2006.01)
B60K 17/16 (2006.01)
F16H 37/08 (2006.01)

(52) U.S. Cl.
CPC ............ *F16H 37/082* (2013.01); *B60K 1/00* (2013.01); *B60K 17/165* (2013.01); *B60K 2001/001* (2013.01)

(58) Field of Classification Search
CPC ..... B64D 35/00; B64C 27/12; F16H 57/0018; F16H 57/021; F16H 57/022; F16H 57/028; F16H 2057/0225; F16H 57/0006; F16H 2057/0012
See application file for complete search history.

(56) References Cited

U.S. PATENT DOCUMENTS 7,828,687 B2 * 11/2010 Nagy .................. F16H 1/28
475/275
2003/0036455 A1 * 2/2003 Ushikoshi ............ F16H 1/46
475/331

FOREIGN PATENT DOCUMENTS

DE  4234873 A1 * 4/1994 ............ F16H 1/46
DE  102019114803 A1 * 12/2020
JP  2002-104001 A    4/2002

* cited by examiner

Primary Examiner — Justin Holmes
(74) Attorney, Agent, or Firm — Oliff PLC

(57) ABSTRACT

The numbers of teeth of all gears that mesh with a first gear portion and a second gear portion in a planetary gear mechanism are values whose remainder is N when divided by 2N. 2N planetary gears include N first type planetary gears and N second type planetary gears. The first type planetary gears and the second type planetary gears are different from each other in phase of gear teeth of the second gear portion with respect to gear teeth of the first gear portion. The first type planetary gears and the second type planetary gears are arranged alternately in a circumferential direction.

9 Claims, 6 Drawing Sheets

VEHICLE DRIVE DEVICE AND METHOD FOR MANUFACTURING PLANETARY GEAR MECHANISM

TECHNICAL FIELD

The present disclosure relates to vehicle drive devices and methods for manufacturing a planetary gear mechanism.

BACKGROUND ART

A vehicle drive device has been used that includes: a rotating electrical machine; a pair of output members drivingly connected to wheels; a speed reducer that reduces the speed of rotation of a rotor; and a differential gear mechanism that distributes the rotation of the rotor transmitted via the speed reducer to the pair of output members. An example of such a vehicle drive device is disclosed in Japanese Unexamined Patent Application Publication No. 2002-104001 (JP 2002-104001 A) (Patent Document 1).

The vehicle drive device (drive device for an electric vehicle) of Patent Document 1 includes, as a speed reducer (speed reduction device 3), a planetary gear mechanism including a carrier (carrier C) that rotatably supports planetary gears each including a first gear portion (first planetary gear P1) and a second gear portion (second planetary gear P2) having a different number of teeth from the first gear portion. The planetary gear mechanism that constitutes the speed reducer includes: a gear (sun gear S1) meshing with the first gear portions and connected to a rotor so as to rotate with the rotor; a gear (first ring gear R1) meshing with the first gear portions and fixed to a non-rotating member (housing 1); and a gear (second ring gear R2) meshing with the second gear portions and connected to an input element (ring gear DR) of a differential gear mechanism (differential 4) so as to rotate with the input element (ring gear DR). The vehicle drive device of Patent Document 1 achieves reduction in weight and cost by using the speed reducer having such a configuration.

In the vehicle drive device of Patent Document 1, however, relatively loud gear noise may be generated due to meshing between the first gear portions and their corresponding gears and meshing between the second gear portions and their corresponding gear (i.e., radial vibration or torsional vibration may occur around the rotation axis of the carrier).

RELATED ART DOCUMENTS

Patent Documents

Patent Document 1: Japanese Unexamined Patent Application Publication No. 2002-104001 (JP 2002-104001 A)

SUMMARY OF THE INVENTION

Problem to be Solved by the Disclosure

It is therefore desired to implement a vehicle drive device with reduced gear noise in a planetary gear mechanism that constitutes a speed reducer.

Means for Solving the Problem

A vehicle drive device according to the present disclosure is a vehicle drive device including: an input member drivingly connected to a driving source; and a speed reducer that reduces a speed of rotation of the input member and outputs resultant rotation to an output member drivingly connected to a wheel.

The speed reducer includes a planetary gear mechanism, the planetary gear mechanism including 2N (where N represents an integer of 2 or more) planetary gears each including a first gear portion and a second gear portion having a different number of teeth from the first gear portion, and a carrier that rotatably supports each of the 2N planetary gears.

The 2N planetary gears are arranged at equal intervals in a circumferential direction.

Meshing phases of circumferentially adjacent ones of the planetary gears are opposite to each other.

The numbers of teeth of all gears that mesh with the first gear portion and the second gear portion in the planetary gear mechanism are values whose remainder is N when divided by 2N.

The 2N planetary gears include N first type planetary gears and N second type planetary gears.

The first type planetary gears and the second type planetary gears are different from each other in phase of gear teeth of the second gear portion with respect to gear teeth of the first gear portion.

The first type planetary gears and the second type planetary gears are arranged alternately in the circumferential direction.

According to this configuration, radial forces generated by meshing of the gears can be cancelled out by the N first type planetary gears and the N second type planetary gears, so that the sum of the radial forces can be reduced to close to zero. In addition, tangential moments acting on meshing portions of the gears can be canceled out by the N first type planetary gears and the N second type planetary gears, so that the sum of the tangential motions can be reduced to close to zero. This can reduce radial vibration around the rotation axis of the carrier and can also reduce torsional vibration around the rotation axis of the carrier. Based on these, it is possible to implement the vehicle drive device with reduced gear noise.

A method for manufacturing a planetary gear mechanism according to the present disclosure is a method for manufacturing a planetary gear mechanism including 2N (where N represents an integer of 2 or more) planetary gears each including a first gear portion and a second gear portion having a different number of teeth from the first gear portion, and a carrier that rotatably supports each of the 2N planetary gears.

The method includes: setting the numbers of teeth of all gears that mesh with the first gear portion and the second gear portion to values whose remainder is N when divided by 2N; preparing N first type planetary gears and N second type planetary gears as the 2N planetary gears such that a phase of gear teeth of the second gear portion with respect to gear teeth of the first gear portion is different by a predetermined set phase difference between the first type planetary gears and the second type planetary gears; arranging the 2N planetary gears at equal intervals in a circumferential direction and arranging the first type planetary gears and the second type planetary gears alternately in the circumferential direction; and setting the set phase difference to an angular difference on a planetary gear axis corresponding to a difference between an angle obtained by dividing 180° by the number of teeth of a ring gear that meshes with the first gear portion and an angle obtained by dividing 180° by the number of teeth of the ring gear that meshes with the second gear portion, or an angular difference on the planetary gear axis corresponding to a difference between an angle obtained by dividing 180° by the number of teeth of a sun gear that meshes with the first gear portion and an angle obtained by dividing 180° by the number of teeth of the sun gear that meshes with the second gear portion, the planetary gear axis being a rotation axis of each of the 2N planetary gears.

According to this configuration, even when the relative positions in a rotational direction of the gear that meshes with the first gear portion and the gear that meshes with the second gear portion are fixed, the first gear portions and the second gear portions of the 2N planetary gears are allowed to appropriately mesh with their corresponding gears, which facilitates assembly of these gears. Radial forces generated by meshing of the gears can be cancelled out by the N first type planetary gears and the N second type planetary gears, so that the sum of the radial forces can be reduced to close to zero. In addition, tangential moments acting on meshing portions of the gears can be canceled out by the N first type planetary gears and the N second type planetary gears, so that the sum of the tangential motions can be reduced to close to zero. This can reduce radial vibration around the rotation axis of the carrier and can also reduce torsional vibration around the rotation axis of the carrier. Based on these, it is possible to manufacture the planetary gear mechanism with reduced gear noise.

Further features and advantages of the technique according to the present disclosure will become more apparent from the following description of illustrative, non-limiting embodiments that will be given with reference to the drawings.

MODES FOR CARRYING OUT THE INVENTION

Figure 1:
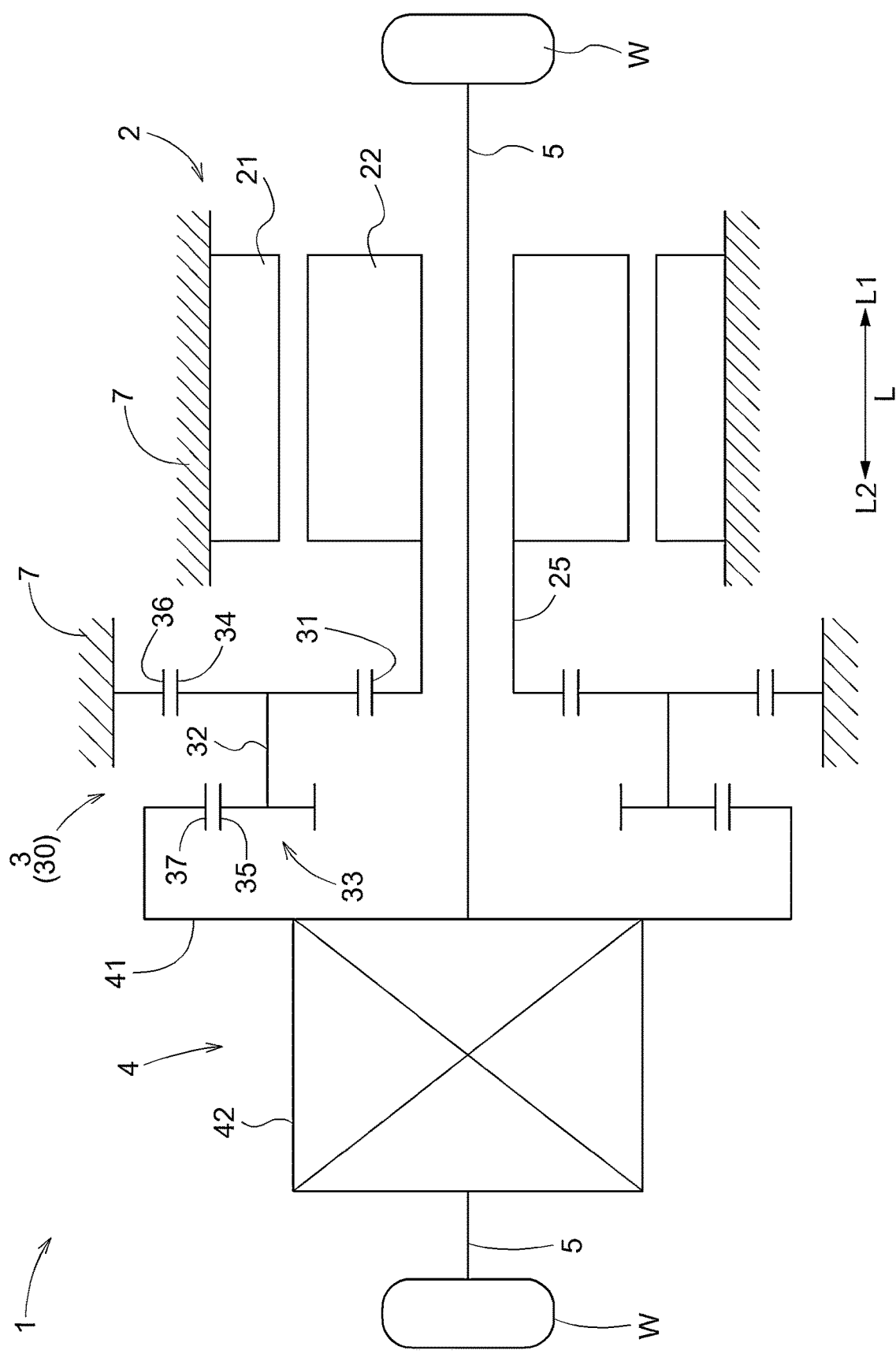
FIG. 1 is a skeleton diagram of a vehicle drive device of an embodiment.

An embodiment of a vehicle drive device will be described with reference to the drawings. As shown in FIG. 1, a vehicle drive device 1 includes a rotating electrical machine 2, a speed reducer 3, a differential gear mechanism 4, and output members 5 drivingly connected to wheels W. These are housed in a case (drive device case) 7.

In the following description, "drivingly connected" refers to a state in which two rotating elements are connected such that a driving force (synonymous with torque) can be transmitted. This concept includes a state in which the two rotating elements are connected so as to rotate together and a state in which the two rotating elements are connected such that a driving force can be transmitted via one or more transmission members. Such transmission members include various members that transmit rotation at the same speed or at a changed speed (e.g., a shaft, a gear mechanism, a belt, etc.), and may include engagement devices that selectively transmit rotation and a driving force (e.g., a friction engagement device, a meshing type engagement device, etc.).

The "rotating electrical machine" is used as a concept including a motor (electric motor), a generator (power generator), and a motor generator that functions as both a motor and a generator as necessary.

In the present embodiment, the rotating electrical machine 2 (rotor 22), the speed reducer 3, and the differential gear mechanism 4 are arranged coaxially. In the following description, the direction along a common rotation axis of these components will be referred to as "axial direction L." One side in the axial direction L will be referred to as "first side L1 in the axial direction," and the other side in the axial direction L will be referred to as "second side L2 in the axial direction." The rotating electrical machine 2 (rotor 22), the speed reducer 3, and the differential gear mechanism 4 are arranged in this order from the first side L1 in the axial direction to the second side L2 in the axial direction.

As described above, it is preferable that the rotating electrical machine 2 be the rotating electrical machine 2 including the rotor 22 connected to a rotor shaft 25 so as to rotate with the rotor shaft 25, the pair of output members 5 be provided, the vehicle drive device further include the differential gear mechanism 4 that distributes rotation of the rotor 22 transmitted via the speed reducer 3 to the pair of output members 5, the rotor 22, the speed reducer 3, and the differential gear mechanism 4 be arranged coaxially, and the rotor 22, the speed reducer 3, and the differential gear mechanism 4 be arranged in this order from the first side L1 in the axial direction to the second side L2 in the axial direction, the axial direction L being the direction along the rotation axis of the rotor 22, the first side L1 in the axial direction being one side in the axial direction L, and the second side L2 in the axial direction being the other side in the axial direction L.

According to this configuration, the rotating electrical machine 2, the speed reducer 3, and the differential gear mechanism 4 are arranged coaxially, which facilitates reduction in size, particularly radial dimension, of the vehicle drive device 1.

The rotating electrical machine 2 functions as a driving force source for the wheels W. The rotating electrical machine 2 includes a stator 21 fixed to the case 7 that is a non-rotating member, and the rotor 22 rotatably supported radially inside the stator 21. The rotating electrical machine 2 is supplied with electric power from an energy storage device (not shown) to perform power running, or supplies electric power generated by the inertial force of the vehicle etc. to the energy storage device to store the electric power in the energy storage device. The rotor 22 of the rotating electrical machine 2 is connected to the rotor shaft 25 so as to rotate with the rotor shaft 25. In the present embodiment, the rotating electrical machine 2 corresponds to the "driving source," and the rotor shaft 25 corresponds to the "input member."

The rotor shaft 25 extends from the rotor 22 toward the second side L2 in the axial direction. A sun gear 31 of a planetary gear mechanism 30 that constitutes the speed reducer 3 is connected to an end on the second side L2 in the axial direction of the rotor shaft 25 so as to rotate with the rotor shaft 25.

Figure 2:
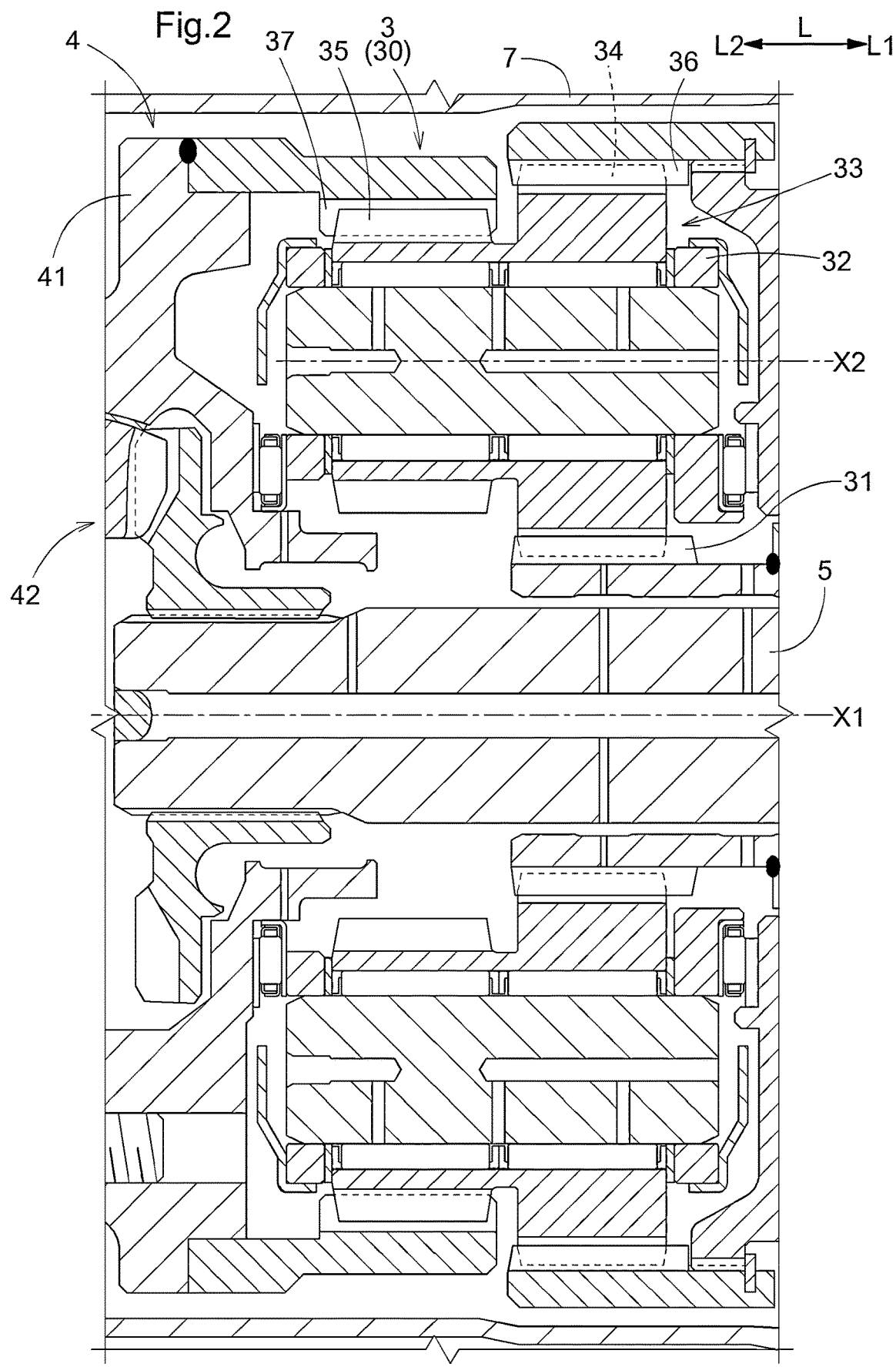
FIG. 2 is a sectional view of a portion near a speed reducer.

The speed reducer 3 reduces the speed of rotation of the rotor 22. As shown in FIGS. 1 and 2, the speed reducer 3 of the present embodiment includes the planetary gear mechanism 30. The planetary gear mechanism 30 constituting the speed reducer 3 includes four rotating elements: the sun gear 31, a carrier 32, a first ring gear 36, and a second ring gear 37. The sun gear 31 is an input rotating element of the speed reducer 3, and is connected to the rotor shaft 25 and the rotor 22 so as to rotate with the rotor shaft 25 and the rotor 22. The first ring gear 36 is fixed to the case 7 that is a non-rotating member. The second ring gear 37 is an output rotating element of the speed reducer 3, and is connected to a differential case 41 of the differential gear mechanism 4 so as to rotate with the differential case 41. The carrier 32 rotatably supports each of a plurality of planetary gears 33 each integrally including a first gear portion 34 that meshes with the sun gear 31 and the first ring gear 36 and a second gear portion 35 that meshes with the second ring gear 37.

As described above, it is preferable that the rotating electrical machine 2 be the rotating electrical machine 2 including the rotor 22 connected to the rotor shaft 25 so as to rotate with the rotor shaft 25, the pair of output members 5 be provided, the vehicle drive device further include the differential gear mechanism 4 that distributes rotation of the rotor 22 transmitted via the speed reducer 3 to the pair of output members 5, the speed reducer 3 further include the sun gear 31 and the first ring gear 36 that mesh with the first gear portion 34, and the second ring gear 37 that meshes with the second gear portion 35, the sun gear 31 be connected to the rotor 22 so as to rotate with the rotor 22, the first ring gear 36 be fixed to the case 7, and the second ring gear 37 be connected to the differential case 41 of the differential gear mechanism 4 so as to rotate with the differential case 41.

According to this configuration, the speed reducer 3 having a relatively simple configuration can reduce the speed of rotation of the rotor 22 at a relatively high reduction ratio and transmit the resultant rotation to the differential gear mechanism 4. This facilitates reduction in size and weight of the vehicle drive device 1.

The carrier 32 rotates about a carrier axis X1. The carrier axis X1 is also the rotation axis of the speed reducer 3, and is a common rotation axis of the rotating electrical machine 2 (rotor 22) and the differential gear mechanism 4. The plurality of planetary gears 33 rotates (turns) about individual planetary gear axes X2 and rotates (revolves) around the carrier axis X1 together with the carrier 32 (see FIG. 3).

The first gear portion 34 and the second gear portion 35 of each planetary gear 33 are formed with different outer diameters from each other and have different numbers of teeth from each other. In the present embodiment, the first gear portion 34 is formed with a larger diameter than the second gear portion 35, and the number of teeth of the first gear portion 34 is set to be larger than that of the second gear portion 35.

The differential case 41 connected to the second ring gear 37 so as to rotate with the second ring gear 37 is an input rotating element of the differential gear mechanism 4. In the present embodiment, the differential case 41 corresponds to the "input member." The differential gear mechanism 4 includes the differential case 41 and a differential body 42. The differential body 42 includes a plurality of bevel gears (e.g., pinion gears and side gears) that meshes with each other, and is responsible for a differential operation. The pair of output members 5 is drivingly connected to the differential gear mechanism 4. The differential gear mechanism 4 distributes rotation of the rotor 22 transmitted via the speed reducer 3 to the pair of output members 5.

The pair of output members 5 is drivingly connected to the wheels W. In the present embodiment, the output member 5 on the first side L1 in the axial direction is disposed radially inward of the speed reducer 3 and the rotating electrical machine 2 so as to extend through the speed reducer 3 and the rotating electrical machine 2, and is drivingly connected to the wheel W at a position on the first side L1 in the axial direction with respect to the rotating electrical machine 2.

One feature of the vehicle drive device 1 of the present embodiment is setting of the numbers of teeth of the sun gear 31, the first ring gear 36, and the second ring gear 37 in relation to the number of planetary gears 33 supported by the carrier 32 of the planetary gear mechanism 30 constituting the speed reducer 3. In relation to this, another feature is that the plurality of planetary gears 33 supported by the carrier 32 includes two different types of planetary gears, rather than being consisting of a single type of planetary gears as is often the case. This will be described below.

The number of planetary gears 33 supported by the carrier 32 of the present embodiment is an even number of 4 or more. That is, each of 2N planetary gears 33 is rotatably supported by the carrier 32, where the symbol "N" is an integer of 2 or more. The number of planetary gears 33 is not particularly limited as long as it is an even number of 4 or more. However, from the viewpoint of ensuring the strength of the carrier 32 that supports the plurality of planetary gears 33, the number of planetary gears 33 is preferably 4 (N=2). In the present embodiment, as shown in FIG. 3, the carrier 32 rotatably supports four planetary gears 33.

Since the number of planetary gears 33 is 2N, the numbers of teeth of all the gears that mesh with the first gear portions 34 and the second gear portions 35 in the planetary gear mechanism 30 (in this example, the sun gear 31, the first ring gear 36, and the second ring gear 37) are set to values whose remainder is N when divided by 2N. By setting the numbers of teeth in this way, circumferentially adjacent ones of the planetary gears 33 mesh with a (1/N) tooth offset on condition that the 2N planetary gears 33 are arranged evenly in the circumferential direction.

For example, in the case where the number of planetary gears 33 is four that is preferable from the viewpoint of ensuring the strength of the carrier 32, circumferentially adjacent ones of the planetary gears 33 mesh with a half tooth offset, and circumferentially opposing ones of the planetary gears 33 mesh at the same time. In other words, the meshing phases of circumferentially adjacent ones of the planetary gears 33 are opposite to each other, and the meshing phases of circumferentially opposing ones of the planetary gears 33 are the same.

Figure 3:
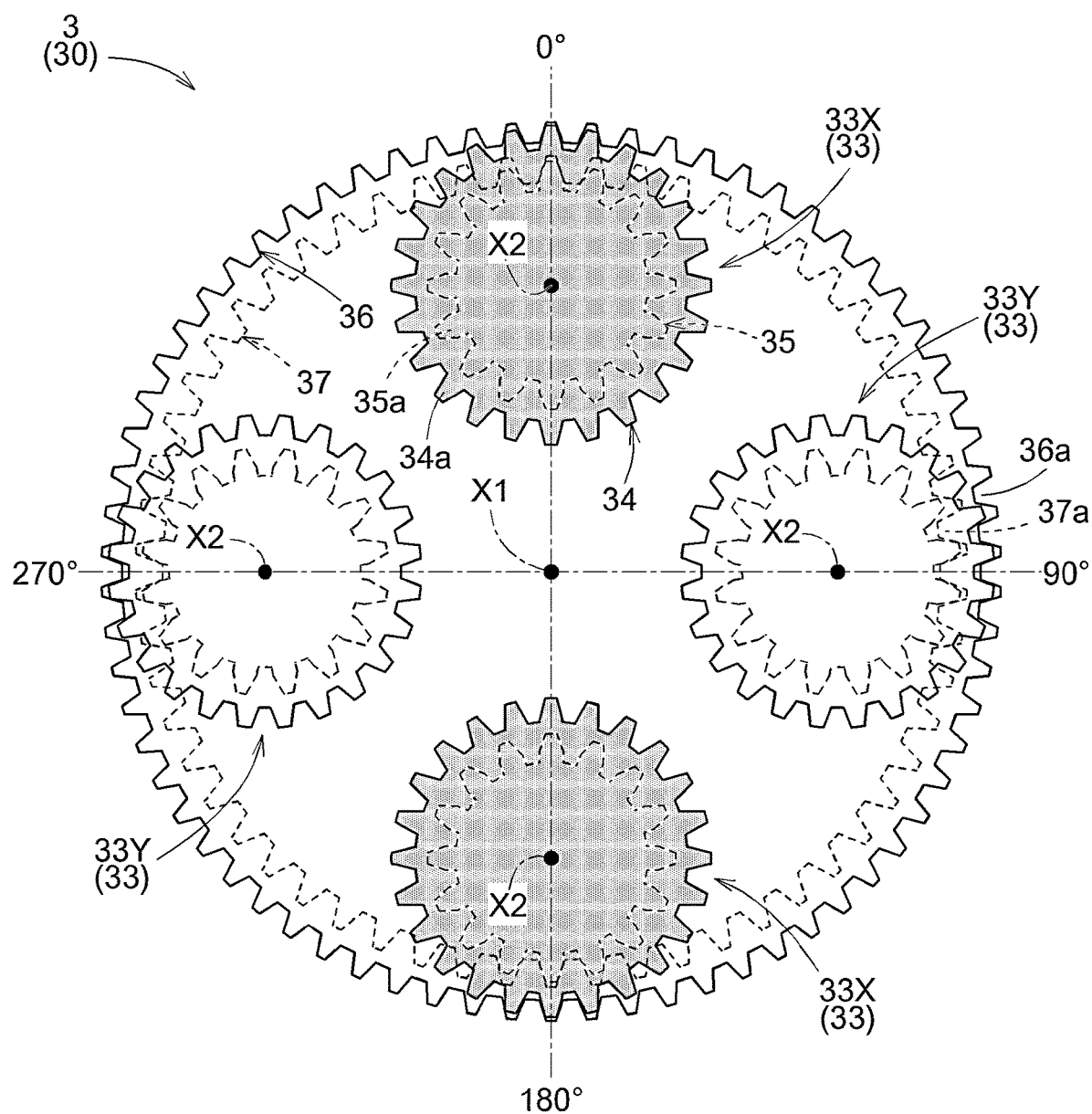
FIG. 3 is a schematic diagram of planetary gears and ring gears as viewed in an axial direction

For example, in the example shown in FIG. 3, two upper and lower planetary gears 33 mesh with a gear tooth 34a of the first gear portion 34 being engaged in a valley of the first ring gear 36 and with a gear tooth 35a of the second gear portion 35 being engaged in a valley of the second ring gear 37 at 0° and 180° positions. On the other hand, two right and let planetary gears 33 mesh with a gear tooth 36a of the first ring gear 36 being engaged in a valley of the first gear portion 34 and a gear tooth 37a of the second ring gear 37 being engaged in a valley of the second gear portion 35 at 90° and 270° positions.

In view of such circumstances, in the present embodiment, the planetary gear mechanism 30 constituting the speed reducer 3 includes, as the 2N planetary gears 33, N first type planetary gears 33X and N second type planetary gears 33Y different from the first type planetary gears 33X. The first type planetary gear 33X and the second type planetary gear 33Y are the same in specifications (pitch diameter, number of teeth, etc.) of the gear teeth 34a of the first gear portion 34 and specifications of the gear teeth 35a of the second gear portion 35, and are different only in phase of the gear teeth 35a of the second gear portion 35 with respect to the gear teeth 34a of the first gear portion 34.

Figure 4:
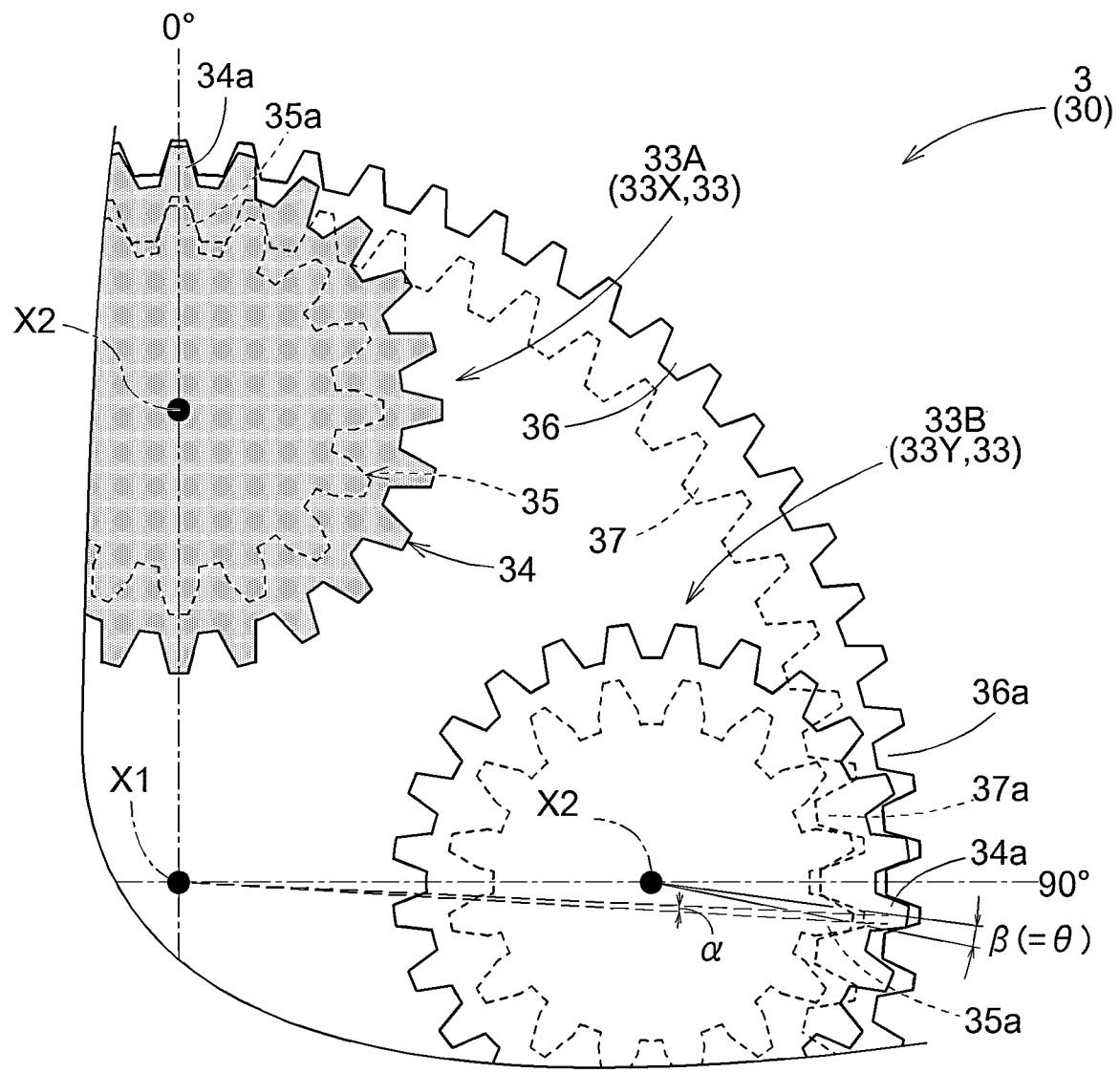
FIG. 4 is a partial enlarged view of FIG. 3.

The difference between the phase of the gear teeth 35a of the second gear portion 35 with respect to the gear teeth 34a of the first gear portion 34 of the first type planetary gear 33X and the phase of the gear teeth 35a of the second gear portion 35 with respect to the gear teeth 34a of the first gear portion 34 of the second type planetary gear 33Y is referred to as "phase difference θ." For example, in the example shown in FIG. 4, both the gear tooth 34a of the first gear portion 34 and the gear tooth 35a of the second gear portion 35 of the first type planetary gear 33X located at 0° mesh with their corresponding ring gears 36, 37 at the 0° position. In the illustrated example, the phase of the first type planetary gear 33X is determined using this set of gear tooth 34a and gear tooth 35a as representative teeth, and the phase is 0°.

On the other hand, in the second type planetary gear 33Y located at 90°, the gear teeth 36a, 37a of the corresponding ring gears 36, 37 mesh with the valleys of the first gear portion 34 and the second gear portion 35 at the 90° position, and the gear tooth 34a of the first gear portion 34 and the gear tooth 35a of the second gear portion 35 are located at positions shifted by half a tooth. This set of gear tooth 34a and gear tooth 35a corresponds to the representative teeth of the first type planetary gear 33X. Since the phase of the first type planetary gear 33X is 0° in this example, the angular difference between the gear tooth 34a of the first gear portion 34 and the gear tooth 35a of the second gear portion 35 is the phase difference θ.

Since there is a restriction that the gear teeth 34a of the first gear portion 34 are engaged in and mesh with the valleys of the first ring gear 36 and the gear teeth 35a of the second gear portion 35 are engaged in and mesh with the valleys of the second ring gear 37, the phase difference θ is set as follows. That is, the phase difference θ is set to the angular difference β on the planetary gear axis X2 corresponding to the difference (angular difference shown by a in FIG. 4) between the angle obtained by dividing 180° by the number of teeth of the ring gear that meshes with the first gear portion 34 (in this example, the first ring gear 36) and the angle obtained by dividing 180° by the number of teeth of the ring gear that meshes with the second gear portion 35 (in this example, the second ring gear 37). The phase difference θ is a value roughly close to the difference between the central angle on the planetary gear axis X2 corresponding to half a tooth of the first ring gear 36 and the central angle on the planetary gear axis X2 corresponding to half a tooth of the second ring gear 37.

As shown in FIG. 3, the 2N planetary gears 33 including the two types of planetary gears, namely the first type planetary gears 33X and the second type planetary gears 33Y, are arranged at equal intervals in the circumferential direction. In addition, the first type planetary gears 33X and the second type planetary gears 33Y are arranged alternately in the circumferential direction. As a result, the radial forces generated by meshing of the gears can be cancelled out by the N first type planetary gears 33X and the N second type planetary gears 33Y, so that the sum of the radial forces can be reduced to close to zero. In addition, the tangential moments acting on the meshing portions of the gears can be canceled out, so that the sum of the tangential motions can be reduced to close to zero.

Figure 5:
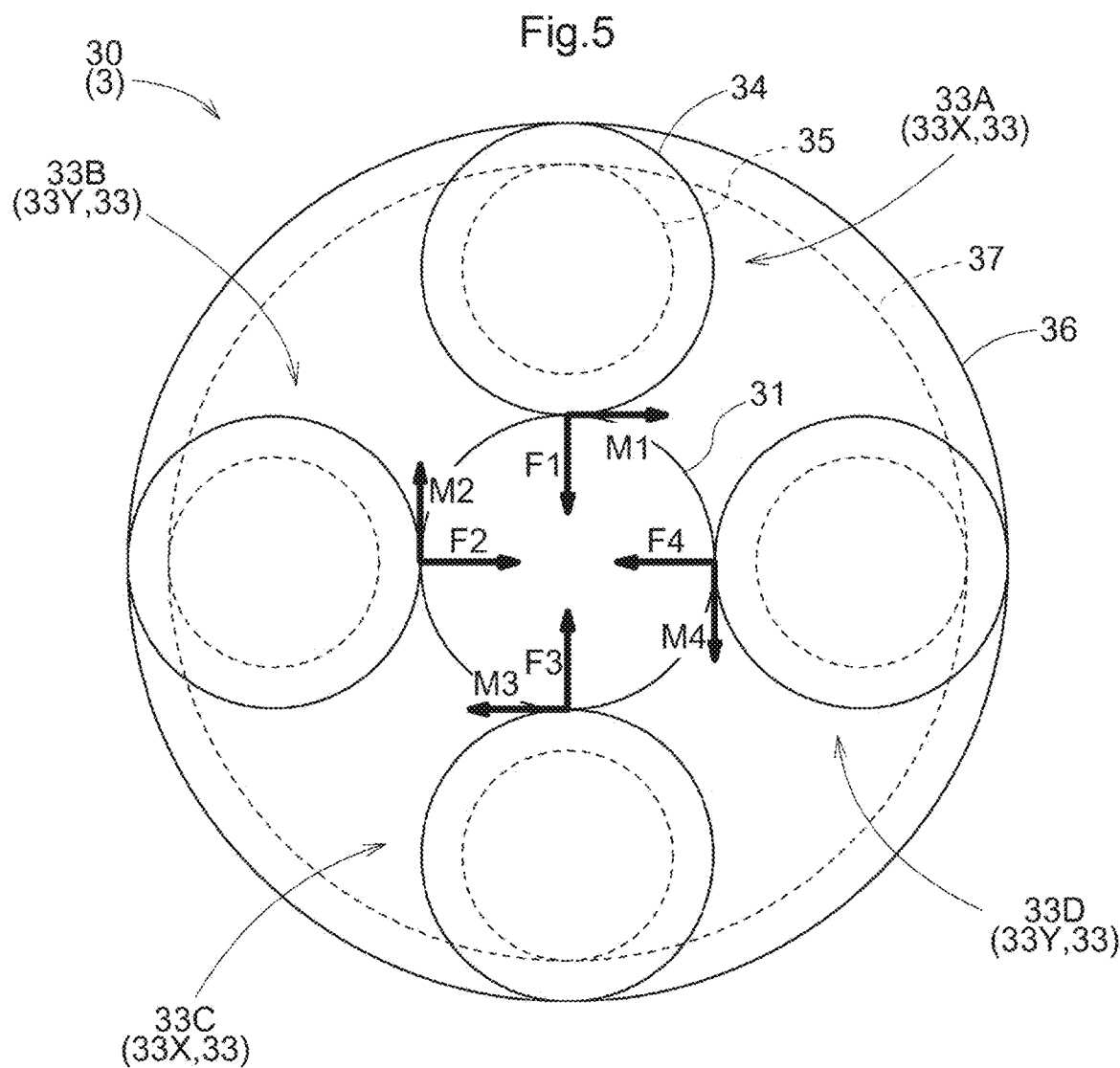
FIG. 5 is a conceptual diagram of forces generated by meshing between a sun gear and the planetary gears.

This will be additionally described with reference to a model in FIG. 5. As shown in this figure, F1 and F3 represent the radial meshing forces of a first planetary gear 33A and a third planetary gear 33C that are the first type planetary gears 33X, respectively, and M1 and M3 represent the tangential meshing moments of the first planetary gear 33A and the third planetary gear 33C, respectively. F2 and F4 represent the radial meshing forces of a second planetary gear 33B and a fourth planetary gear 33D that are the second type planetary gears 33Y, respectively, and M2 and M4 represent the tangential meshing moments of the second planetary gear 33B and the fourth planetary gear 33D, respectively.

Figure 6:
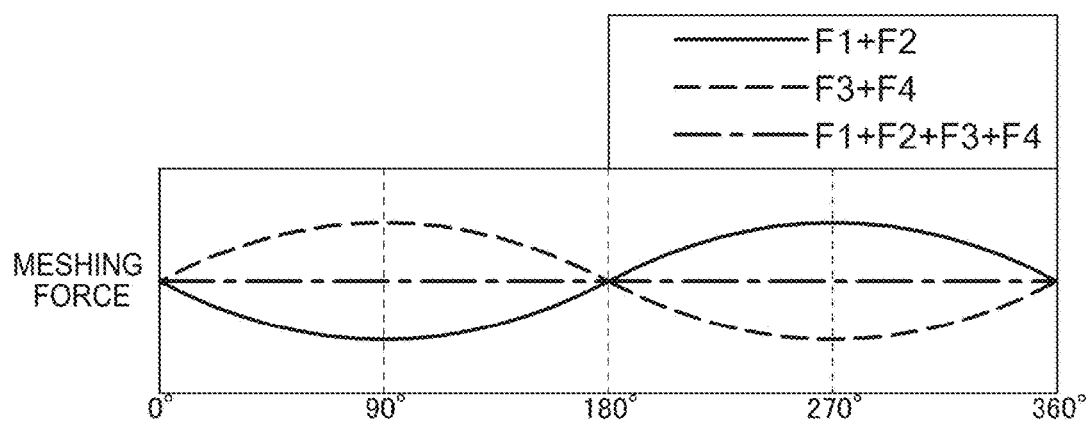
FIG. 6 is a graph showing radial meshing forces according to the rotational position.
Figure 7:
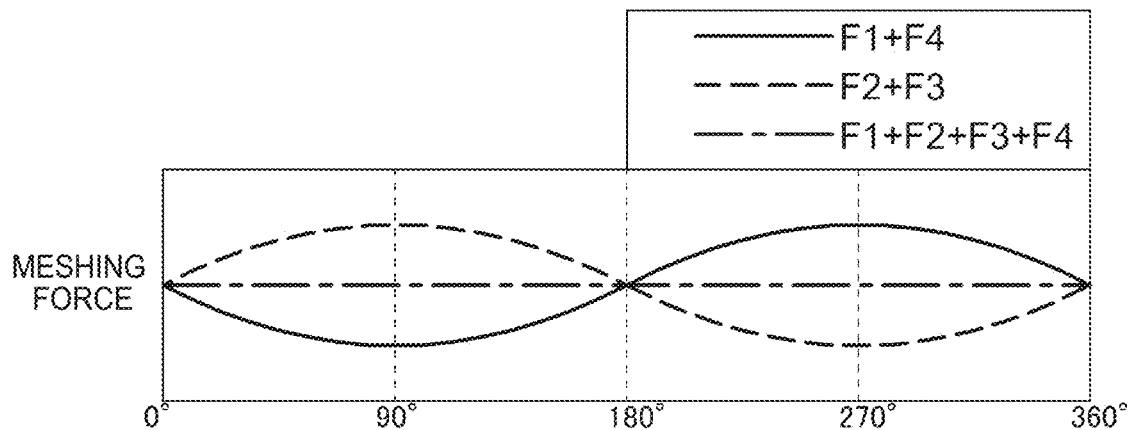
FIG. 7 is a graph showing radial meshing forces according to the rotational position.

FIGS. 6 and 7 are graphs showing the radial meshing forces according to the rotational position of the carrier 32. FIG. 6 shows individual calculations for a set of the first planetary gear 33A and the second planetary gear 33B and a set of the third planetary gear 33C and the fourth planetary gear 33D. FIG. 7 shows individual calculations for a set of the first planetary gear 33A and the fourth planetary gear 33D and a set of the second planetary gear 33B and the third planetary gear 33C. In both figures, it can be seen that the sets mesh with the meshing forces in opposite phases and that the total meshing force as a whole is maintained at a constant value without fluctuation regardless of the rotational position of the carrier 32.

Figure 8:
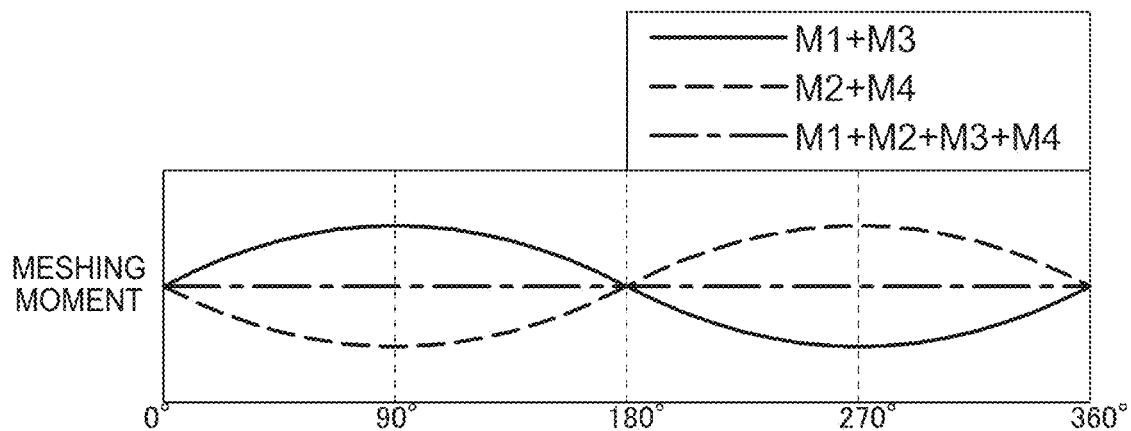
FIG. 8 is a graph showing tangential meshing moments according to the rotational position.

FIG. 8 is a graph showing the tangential meshing moments according to the rotational position of the carrier 32. FIG. 8 shows individual calculations for a set of the first planetary gear 33A and the third planetary gear 33C and a set of the second planetary gear 33B and the fourth planetary gear 33D. It can be seen that the sets mesh with the meshing moments in opposite phases and that the total meshing moment as a whole is maintained at a constant value without fluctuation regardless of the rotational position of the carrier 32.

In this manner, by using the planetary gear mechanism 30 of the present embodiment, the total meshing force and the total meshing moment can be maintained at constant values, so that gear noise can be reduced.

As described above, the vehicle drive device 1 is the vehicle drive device 1 including the rotor shaft 25 drivingly connected to the rotating electrical machine 2, and the speed reducer 3 that reduces the speed of rotation of the rotor shaft 25 and outputs the resultant rotation to the output members 5 drivingly connected to the wheels W.

The speed reducer 3 includes the planetary gear mechanism 30, the planetary gear mechanism 30 including the 2N (where N represents an integer of 2 or more) planetary gears 33 each including the first gear portion 34 and the second gear portion 35 having a different number of teeth from the first gear portion 34, and the carrier 32 that rotatably supports each of the 2N planetary gears 33.

The 2N planetary gears 33 are arranged at equal intervals in the circumferential direction.

The meshing phases of circumferentially adjacent ones of the planetary gears 33 are opposite to each other.

The numbers of teeth of all the gears that mesh with the first gear portion 34 and the second gear portion 35 in the planetary gear mechanism 30 are values whose remainder is N when divided by 2N.

The 2N planetary gears 33 include the N first type planetary gears 33X and the N second type planetary gears 33Y.

The first type planetary gears 33X and the second type planetary gears 33Y are different from each other in phase of the gear teeth 35a of the second gear portion 35 with respect to the gear teeth 34a of the first gear portion 34.

The first type planetary gears 33X and the second type planetary gears 33Y are arranged alternately in the circumferential direction.

According to this configuration, the radial forces generated by meshing of the gears can be cancelled out by the N first type planetary gears 33X and the N second type planetary gears 33Y, so that the sum of the radial forces can be reduced to close to zero. In addition, the tangential moments acting on the meshing portions of the gears can be canceled out by the N first type planetary gears 33X and the N second type planetary gears 33Y, so that the sum of the tangential motions can be reduced to close to zero. This can reduce radial vibration around the rotation axis of the carrier 32 and can also reduce torsional vibration around the rotation axis of the carrier 32. Based on these, it is possible to implement the vehicle drive device 1 with reduced gear noise.

Other Embodiments (1) In the above embodiment, the configuration in which the first gear portion 34 is formed with a larger diameter than the second gear portion 35 and the number of teeth of the first gear portion 34 is set to be larger than that of the second gear portion 35 is described as an example. However, the present disclosure is not limited to such a configuration. For example, the first gear portion 34 may be formed with a smaller diameter than the second gear portion 35, and the number of teeth of the first gear portion 34 may be set to be smaller than that of the second gear portion 35. The first gear portion 34 and the second gear portion 35 may have the same diameter as long as they have different numbers of teeth.

(2) In the above embodiment, the configuration in which the planetary gear mechanism 30 includes the sun gear 31, the carrier 32, the first ring gear 36, and the second ring gear 37 as four rotating elements is described as an example. However, the present disclosure is not limited to such a configuration, and the planetary gear mechanism 30 may be configured to include, for example, a first sun gear, a second sun gear, the carrier 32, and a ring gear. In this case, the first gear portion 34 meshes with, for example, the first sun gear and the ring gear, and the second gear portion 35 meshes with, for example, the second sun gear. In this case, for example, the ring gear is connected to the rotor 22 so as to rotate with the rotor 22, one of the first sun gear and the second sun gear is fixed to the case 7, and the other of the first sun gear and the second sun gear is connected to the differential case 41 of the differential gear mechanism 4 so as to rotate with the differential case 41. In such a configuration, the phase difference θ between the phase of the gear teeth 35a of the second gear portion 35 with respect to the gear teeth 34a of the first gear portion 34 of the first type planetary gear 33X and the phase of the gear teeth 35a of the second gear portion 35 with respect to the gear teeth 34a of the first gear portion 34 of the second type planetary gear 33Y is preferably set to the angular difference on the planetary gear axis X2 corresponding to the difference between the angle obtained by dividing 180° by the number of teeth of the first sun gear that meshes with the first gear portion 34 and the angle obtained by dividing 180° by the number of teeth of the second sun gear that meshes with the second gear portion 35.

As described above, it is preferable that the phase difference, namely the difference between the phase of the gear teeth 35a of the second gear portion 35 with respect to the gear teeth 34a of the first gear portion 34 of the first type planetary gear 33X and the phase of the gear teeth 35a of the second gear portion 35 with respect to the gear teeth 34a of the first gear portion 34 of the second type planetary gear 33Y, be set to the angular difference on the planetary gear axis X2 corresponding to the difference between the angle obtained by dividing 180° by the number of teeth of the ring gear that meshes with the first gear portion 34 and the angle obtained by dividing 180° by the number of teeth of the ring gear that meshes with the second gear portion 35, or the angular difference on the planetary gear axis X2 corresponding to the difference between the angle obtained by dividing 180° by the number of teeth of the sun gear 31 that meshes with the first gear portion 34 and the angle obtained by dividing 180° by the number of teeth of the sun gear 31 that meshes with the second gear portion 35, the planetary gear axis X2 being the rotation axis of each of the 2N planetary gears 33.

According to this configuration, even when the relative positions in the rotational direction of the gear that meshes with the first gear portion 34 and the gear that meshes with the second gear portion 35 are fixed, the first gear portions 34 and the second gear portions 35 of the 2N planetary gears 33 are allowed to appropriately mesh with their corresponding gears. It is therefore possible to easily assemble the 2N planetary gears 33 and the gears that mesh therewith and to implement the planetary gear mechanism 30 with reduced gear noise.

A method for manufacturing the planetary gear mechanism 30 of the embodiment is a method for manufacturing the planetary gear mechanism 30 including the 2N (where N represents an integer of 2 or more) planetary gears 33 each including the first gear portion 34 and the second gear portion 35 having a different number of teeth from the first gear portion 34, and the carrier 32 that rotatably supports each of the 2N planetary gears 33. The method includes: setting the numbers of teeth of all the gears that mesh with the first gear portion 34 and the second gear portion 35 to values whose remainder is N when divided by 2N; preparing the N first type planetary gears 33X and the N second type planetary gears 33Y as the 2N planetary gears 33 such that the phase of the gear teeth 35a of the second gear portion 35 with respect to the gear teeth 34a of the first gear portion 34 is different by a predetermined set phase difference between the first type planetary gears 33X and the second type planetary gears 33Y; arranging the 2N planetary gears 33 at equal intervals in the circumferential direction and arranging the first type planetary gears 33X and the second type planetary gears 33Y alternately in the circumferential direction; and setting the set phase difference to the angular difference on the planetary gear axis X2 corresponding to the difference between the angle obtained by dividing 180° by the number of teeth of the ring gear that meshes with the first gear portion 34 and the angle obtained by dividing 180° by the number of teeth of the ring gear that meshes with the second gear portion 35, or the angular difference on the planetary gear axis X2 corresponding to the difference between the angle obtained by dividing 180° by the number of teeth of the sun gear 31 that meshes with the first gear portion 34 and the angle obtained by dividing 180° by the number of teeth of the sun gear 31 that meshes with the second gear portion 35, the planetary gear axis X2 being the rotation axis of each of the 2N planetary gears 33.

According to this configuration, even when the relative positions in the rotational direction of the gear that meshes with the first gear portion 34 and the gear that meshes with the second gear portion 35 are fixed, the first gear portions 34 and the second gear portions 35 of the 2N planetary gears 33 are allowed to appropriately mesh with their corresponding gears, which facilitates assembly of these gears. The radial forces generated by meshing of the gears can be cancelled out by the N first type planetary gears 33X and the N second type planetary gears 33Y, so that the sum of the radial forces can be reduced to close to zero. In addition, the tangential moments acting on the meshing portions of the gears can be canceled out by the N first type planetary gears 33X and the N second type planetary gears 33Y, so that the sum of the tangential motions can be reduced to close to zero. This can reduce radial vibration around the rotation axis of the carrier 32 and can also reduce torsional vibration around the rotation axis of the carrier 32. Based on these, it is possible to manufacture the planetary gear mechanism 30 with reduced gear noise.

(3) In the above embodiment, the uniaxial configuration in which the rotating electrical machine 2, the output members 5, the speed reducer 3, and the differential gear mechanism 4 are coaxially arranged is described as an example. However, the present disclosure is not limited to such configuration, and a multi-axis configuration in which one or more of these is disposed on a different axis may be used.

(4) In the above embodiment, the configuration in which the rotating electrical machine 2 included in the vehicle drive device 1 functions as a driving source is described as an example. However, the present disclosure is not limited to such a configuration, and an internal combustion engine serving as a driving source may be provided outside the vehicle drive device 1. In this case, the vehicle drive device 1 includes an input member drivingly connected to the internal combustion engine, and the driving force of the internal combustion engine is input to the vehicle drive device 1 via the input member.

(5) In the above embodiment, the configuration in which the vehicle drive device 1 includes the differential gear mechanism 4 that distributes rotation of the rotor 22 transmitted via the speed reducer 3 to the pair of output members 5 is described as an example. However, the present disclosure is not limited to such a configuration, and rotation of the rotor 22 transmitted via the speed reducer 3 may be transmitted to a single output member 5 (and thus a single wheel W). Such a configuration can be suitably applied to the vehicle drive device 1 provided in a so-called in-wheel motor vehicle.

(6) The configuration disclosed in each of the embodiments described above (including the above embodiment and the other embodiments; the same applies hereafter) can be applied in combination with the configurations disclosed in the other embodiments as long as no contradiction arises. Regarding other configurations, the embodiments disclosed in this specification are illustrative in all respects, and can be modified as appropriate without departing from the spirit and scope of the present disclosure.

Summary of Embodiments

In summary, the vehicle drive device according to the present disclosure suitably includes the following configurations.

A vehicle drive device (1) includes: an input member (25) drivingly connected to a driving source (2); and a speed reducer (3) that reduces a speed of rotation of the input member (25) and outputs resultant rotation to an output member (5) drivingly connected to a wheel (W).

The speed reducer (3) includes a planetary gear mechanism (30), the planetary gear mechanism (30) including 2N (where N represents an integer of 2 or more) planetary gears (33) each including a first gear portion (34) and a second gear portion (35) having a different number of teeth from the first gear portion (34), and a carrier (32) that rotatably supports each of the 2N planetary gears (33).

The 2N planetary gears (33) are arranged at equal intervals in a circumferential direction.

Meshing phases of circumferentially adjacent ones of the planetary gears (33) are opposite to each other.

The numbers of teeth of all gears that mesh with the first gear portion (34) and the second gear portion (35) in the planetary gear mechanism (30) are values whose remainder is N when divided by 2N.

The 2N planetary gears (33) include N first type planetary gears (33X) and N second type planetary gears (33Y).

The first type planetary gears (33X) and the second type planetary gears (33Y) are different from each other in phase of gear teeth (35a) of the second gear portion (35) with respect to gear teeth (34a) of the first gear portion (34).

The first type planetary gears (33X) and the second type planetary gears (33Y) are arranged alternately in the circumferential direction.

According to this configuration, radial forces generated by meshing of the gears can be cancelled out by the N first type planetary gears (33X) and the N second type planetary gears (33Y), so that the sum of the radial forces can be reduced to close to zero. In addition, tangential moments acting on meshing portions of the gears can be canceled out by the N first type planetary gears (33X) and the N second type planetary gears (33Y), so that the sum of the tangential motions can be reduced to close to zero. This can reduce radial vibration around the rotation axis of the carrier (32) and can also reduce torsional vibration around the rotation axis of the carrier (32). Based on these, it is possible to implement the vehicle drive device (1) with reduced gear noise.

As one aspect, it is preferable that a phase difference ($\theta$) that is a difference between the phase of the gear teeth (35a) of the second gear portion (35) with respect to the gear teeth (34a) of the first gear portion (34) of the first type planetary gear (33X) and the phase of the gear teeth (35a) of the second gear portion (35) with respect to the gear teeth (34a) of the first gear portion (34) of the second type planetary gear (33Y) be set to an angular difference on a planetary gear axis (X2) corresponding to a difference between an angle obtained by dividing 180° by the number of teeth of a ring gear that meshes with the first gear portion (34) and an angle obtained by dividing 180° by the number of teeth of the ring gear that meshes with the second gear portion (35), or an angular difference on the planetary gear axis (X2) corresponding to a difference between an angle obtained by dividing 180° by the number of teeth of a sun gear (31) that meshes with the first gear portion (34) and an angle obtained by dividing 180° by the number of teeth of the sun gear (31) that meshes with the second gear portion (35), the planetary gear axis (X2) being a rotation axis of each of the 2N planetary gears (33).

According to this configuration, even when the relative positions in a rotational direction of the gear that meshes with the first gear portion (34) and the gear that meshes with the second gear portion (35) are fixed, the first gear portions (34) and the second gear portions (35) of the 2N planetary gears (33) are allowed to appropriately mesh with their corresponding gears. It is therefore possible to easily assemble the 2N planetary gears (33) and the gears that mesh therewith and to implement the planetary gear mechanism (30) with reduced gear noise.

As one aspect, it is preferable that the driving source (2) be a rotating electrical machine (2) including a rotor (22) connected to the input member (25) so as to rotate with the input member (25), a pair of the output members (5) be provided, the vehicle drive device further include a differential gear mechanism (4) that distributes rotation of the rotor (22) transmitted via the speed reducer (3) to the pair of output members (5), the speed reducer (3) further include a sun gear (31) and a first ring gear (36) that mesh with the first gear portion (34), and a second ring gear (37) that meshes with the second gear portion (35), the sun gear (31) be connected to the rotor (22) so as to rotate with the rotor (22), the first ring gear (36) be fixed to a non-rotating member (7), and the second ring gear (37) be connected to an input element (41) of the differential gear mechanism (4) so as to rotate with the input element (41).

According to this configuration, the speed reducer (3) having a relatively simple configuration can reduce the speed of rotation of the rotor (22) at a relatively high reduction ratio and transmit the resultant rotation to the differential gear mechanism (4). This facilitates reduction in size and weight of the vehicle drive device (1).

As one aspect, it is preferable that the driving source (2) be a rotating electrical machine (2) including a rotor (22) connected to the input member (25) so as to rotate with the input member (25), a pair of the output members (5) be provided, the vehicle drive device further include a differential gear mechanism (4) that distributes rotation of the rotor (22) transmitted via the speed reducer (3) to the pair of output members (5), the rotor (22), the speed reducer (3), and the differential gear mechanism (4) be arranged coaxially, and the rotor (22), the speed reducer (3), and the differential gear mechanism (4) be arranged in this order from a first side (L1) in an axial direction to a second side (L2) in the axial direction, the axial direction (L) being a direction along a rotation axis of the rotor (22), the first side (L1) in the axial direction being one side in the axial direction (L), and the second side (L2) in the axial direction being the other side in the axial direction (L).

According to this configuration, the rotating electrical machine (2), the speed reducer (3), and the differential gear mechanism (4) are arranged coaxially, which facilitates reduction in size, particularly radial dimension, of the vehicle drive device (1).

The method for manufacturing a planetary gear mechanism according to the present disclosure suitably includes the following configuration.

A method for manufacturing a planetary gear mechanism (30) including 2N (where N represents an integer of 2 or more) planetary gears (33) each including a first gear portion (34) and a second gear portion (35) having a different number of teeth from the first gear portion (34), and a carrier (32) that rotatably supports each of the 2N planetary gears (33).

The method includes: setting the numbers of teeth of all gears that mesh with the first gear portion (34) and the second gear portion (35) to values whose remainder is N when divided by 2N; preparing N first type planetary gears (33X) and N second type planetary gears (33Y) as the 2N planetary gears (33), a phase of gear teeth (35a) of the second gear portion (35) with respect to gear teeth (34a) of the first gear portion (34) being different by a predetermined set phase difference (θ) between the first type planetary gears (33X) and the second type planetary gears (33Y); arranging the 2N planetary gears (33) at equal intervals in a circumferential direction and arranging the first type planetary gears (33X) and the second type planetary gears (33Y) alternately in the circumferential direction; and setting the set phase difference (θ) to an angular difference on a planetary gear axis (X2) corresponding to a difference between an angle obtained by dividing 180° by the number of teeth of a ring gear that meshes with the first gear portion (34) and an angle obtained by dividing 180° by the number of teeth of the ring gear that meshes with the second gear portion (35), or an angular difference on the planetary gear axis (X2) corresponding to a difference between an angle obtained by dividing 180° by the number of teeth of a sun gear (31) that meshes with the first gear portion (34) and an angle obtained by dividing 180° by the number of teeth of the sun gear (31) that meshes with the second gear portion (35), the planetary gear axis (X2) being a rotation axis of each of the 2N planetary gears (33).

According to this configuration, even when the relative positions in a rotational direction of the gear that meshes with the first gear portion (34) and the gear that meshes with the second gear portion (35) are fixed, the first gear portions (34) and the second gear portions (35) of the 2N planetary gears (33) are allowed to appropriately mesh with their corresponding gears, which facilitates assembly of these gears. Radial forces generated by meshing of the gears can be cancelled out by the N first type planetary gears (33X) and the N second type planetary gears (33Y), so that the sum of the radial forces can be reduced to close to zero. In addition, tangential moments acting on meshing portions of the gears can be canceled out by the N first type planetary gears (33X) and the N second type planetary gears (33Y), so that the sum of the tangential motions can be reduced to close to zero. This can reduce radial vibration around the rotation axis of the carrier (32) and can also reduce torsional vibration around the rotation axis of the carrier (32). Based on these, it is possible to manufacture the planetary gear mechanism (30) with reduced gear noise.

The vehicle drive device and the method for manufacturing the planetary gear mechanism according to the present disclosure need only attain at least one of the effects described above.

Description of the Reference Numerals

1: vehicle drive device, 2: rotating electrical machine (driving source), 3: speed reducer, 4: differential gear mechanism, 5: output member, 7: case (non-rotating member), 21: stator, 22: rotor, 25: rotor shaft (input member), 30: planetary gear mechanism, 31: sun gear, 32: carrier, 33: planetary gear, 33A: first planetary gear, 33B: second planetary gear, 33C: third planetary gear, 33D: fourth planetary gear, 33X: first type planetary gear, 33Y: second type planetary gear, 34: first gear portion, 34a: gear tooth, 35: second gear portion, 35a: gear tooth, 36: first ring gear, 36a: gear tooth, 37: second ring gear, 37a: gear tooth, 41: differential case (input element), 42: differential body, L: axial direction, L1: first side in axial direction, L2: second side in axial direction, W: wheel, X1: carrier axis, X2: planetary gear axis, θ: phase difference

What is claimed is:

1. A vehicle drive device comprising: an input member drivingly connected to a driving source; and a speed reducer that reduces a speed of rotation of the input member and outputs resultant rotation to an output member drivingly connected to a wheel, wherein the speed reducer includes a planetary gear mechanism,
the planetary gear mechanism including 2N (where N represents an integer of 2 or more) planetary gears each including a first gear portion and a second gear portion having a different number of teeth from the first gear portion, and a carrier that rotatably supports each of the 2N planetary gears,
the 2N planetary gears are arranged at equal intervals in a circumferential direction,
meshing phases of circumferentially adjacent ones of the planetary gears are opposite to each other,
the numbers of teeth of all gears that mesh with the first gear portion and the second gear portion in the planetary gear mechanism are values whose remainder is N when divided by 2N,
the 2N planetary gears include N first type planetary gears and N second type planetary gears,
the first type planetary gears and the second type planetary gears are different from each other in phase of gear teeth of the second gear portion with respect to gear teeth of the first gear portion, and
the first type planetary gears and the second type planetary gears are arranged alternately in the circumferential direction.

2. The vehicle drive device according to claim 1, wherein a phase difference that is a difference between the phase of the gear teeth of the second gear portion with respect to the gear teeth of the first gear portion of the first type planetary gear and the phase of the gear teeth of the second gear portion with respect to the gear teeth of the first gear portion of the second type planetary gear is set to an angular difference on a planetary gear axis corresponding to a difference between an angle obtained by dividing 180° by the number of teeth of a ring gear that meshes with the first gear portion and an angle obtained by dividing 180° by the number of teeth of the ring gear that meshes with the second gear portion, or an angular difference on the planetary gear axis corresponding to a difference between an angle obtained by dividing 180° by the number of teeth of a sun gear that meshes with the first gear portion and an angle obtained by dividing 180° by the number of teeth of the sun gear that meshes with the second gear portion, the planetary gear axis being a rotation axis of each of the 2N planetary gears.

3. The vehicle drive device according to claim 2, wherein the driving source is a rotating electrical machine including a rotor connected to the input member so as to rotate with the input member,
a pair of the output members is provided,
the vehicle drive device further includes a differential gear mechanism that distributes rotation of the rotor transmitted via the speed reducer to the pair of output members,
the speed reducer further includes a sun gear and a first ring gear that mesh with the first gear portion, and a second ring gear that meshes with the second gear portion,
the sun gear is connected to the rotor so as to rotate with the rotor,
the first ring gear is fixed to a non-rotating member, and
the second ring gear is connected to an input element of the differential gear mechanism so as to rotate with the input element.

4. The vehicle drive device according to claim 3, wherein the driving source is a rotating electrical machine including a rotor connected to the input member so as to rotate with the input member, and
a pair of the output members is provided,
the vehicle drive device further includes a differential gear mechanism that distributes rotation of the rotor transmitted via the speed reducer to the pair of output members,
the rotor, the speed reducer, and the differential gear mechanism are arranged coaxially, and
the rotor, the speed reducer, and the differential gear mechanism are arranged in this order from a first side in an axial direction to a second side in the axial direction,
the axial direction being a direction along a rotation axis of the rotor, the first side in the axial direction being one side in the axial direction, and the second side in the axial direction being the other side in the axial direction.

5. The vehicle drive device according to claim 2, wherein the driving source is a rotating electrical machine including a rotor connected to the input member so as to rotate with the input member, and
a pair of the output members is provided,
the vehicle drive device further includes a differential gear mechanism that distributes rotation of the rotor transmitted via the speed reducer to the pair of output members,
the rotor, the speed reducer, and the differential gear mechanism are arranged coaxially, and
the rotor, the speed reducer, and the differential gear mechanism are arranged in this order from a first side in an axial direction to a second side in the axial direction,
the axial direction being a direction along a rotation axis of the rotor, the first side in the axial direction being one side in the axial direction, and the second side in the axial direction being the other side in the axial direction.

6. The vehicle drive device according to claim 1, wherein the driving source is a rotating electrical machine including a rotor connected to the input member so as to rotate with the input member,
a pair of the output members is provided,
the vehicle drive device further includes a differential gear mechanism that distributes rotation of the rotor transmitted via the speed reducer to the pair of output members,
the speed reducer further includes a sun gear and a first ring gear that mesh with the first gear portion, and a second ring gear that meshes with the second gear portion,
the sun gear is connected to the rotor so as to rotate with the rotor,
the first ring gear is fixed to a non-rotating member, and
the second ring gear is connected to an input element of the differential gear mechanism so as to rotate with the input element.

7. The vehicle drive device according to claim 6, wherein the driving source is a rotating electrical machine including a rotor connected to the input member so as to rotate with the input member, and
a pair of the output members is provided,
the vehicle drive device further includes a differential gear mechanism that distributes rotation of the rotor transmitted via the speed reducer to the pair of output members,
the rotor, the speed reducer, and the differential gear mechanism are arranged coaxially, and the rotor, the speed reducer, and the differential gear mechanism are arranged in this order from a first side in an axial direction to a second side in the axial direction, the axial direction being a direction along a rotation axis of the rotor, the first side in the axial direction being one side in the axial direction, and the second side in the axial direction being the other side in the axial direction.

8. The vehicle drive device according to claim 1, wherein the driving source is a rotating electrical machine including a rotor connected to the input member so as to rotate with the input member, and a pair of the output members is provided, the vehicle drive device further includes a differential gear mechanism that distributes rotation of the rotor transmitted via the speed reducer to the pair of output members, the rotor, the speed reducer, and the differential gear mechanism are arranged coaxially, and the rotor, the speed reducer, and the differential gear mechanism are arranged in this order from a first side in an axial direction to a second side in the axial direction, the axial direction being a direction along a rotation axis of the rotor, the first side in the axial direction being one side in the axial direction, and the second side in the axial direction being the other side in the axial direction.

9. A method for manufacturing a planetary gear mechanism including 2N (where N represents an integer of 2 or more) planetary gears each including a first gear portion and a second gear portion having a different number of teeth from the first gear portion, and a carrier that rotatably supports each of the 2N planetary gears, the method comprising:

setting the numbers of teeth of all gears that mesh with the first gear portion and the second gear portion to values whose remainder is N when divided by 2N;

preparing N first type planetary gears and N second type planetary gears as the 2N planetary gears such that a phase of gear teeth of the second gear portion with respect to gear teeth of the first gear portion is different by a predetermined set phase difference between the first type planetary gears and the second type planetary gears;

arranging the 2N planetary gears at equal intervals in a circumferential direction and arranging the first type planetary gears and the second type planetary gears alternately in the circumferential direction; and setting the set phase difference to an angular difference on a planetary gear axis corresponding to a difference between an angle obtained by dividing 180° by the number of teeth of a ring gear that meshes with the first gear portion and an angle obtained by dividing 180° by the number of teeth of the ring gear that meshes with the second gear portion, or an angular difference on the planetary gear axis corresponding to a difference between an angle obtained by dividing 180° by the number of teeth of a sun gear that meshes with the first gear portion and an angle obtained by dividing 180° by the number of teeth of the sun gear that meshes with the second gear portion, the planetary gear axis being a rotation axis of each of the 2N planetary gears.

* * * * *